(12) United States Patent
Kim

(10) Patent No.: US 7,545,118 B2
(45) Date of Patent: Jun. 9, 2009

(54) CHARGE SYSTEM AND CHARGER FOR AN ELECTRIC APPARATUS AND A CONTROL METHOD THEREOF

(75) Inventor: Jong-Min Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 510 days.

(21) Appl. No.: 11/225,199

(22) Filed: Sep. 14, 2005

(65) Prior Publication Data

US 2006/0103353 A1   May 18, 2006

(30) Foreign Application Priority Data

Nov. 16, 2004   (KR) ...................... 10-2004-0093687

(51) Int. Cl.
*H02J 7/00* (2006.01)
(52) U.S. Cl. .................. 320/128; 320/135; 320/136
(58) Field of Classification Search ................ 320/128, 320/135, 136, 158, 163
See application file for complete search history.

(56) References Cited

U.S. PATENT DOCUMENTS 5,200,685 A * 4/1993 Sakamoto .................. 320/103
5,721,481 A * 2/1998 Narita et al. ............... 320/111
6,509,717 B2 * 1/2003 Lee ............................ 320/116
6,626,703 B2   9/2003 Hsin ........................... 439/638

FOREIGN PATENT DOCUMENTS

| JP | 2004-104998 | 4/2004 |
| KR | 2002-0019494 | 3/2002 |
| KR | 20-0326739 | 9/2003 |
| KR | 20-0333065 | 11/2003 |
| WO | 02/075894 | 9/2002 |

* cited by examiner

*Primary Examiner*—Akm Enayet Ullah
*Assistant Examiner*—Aaron Piggush
(74) *Attorney, Agent, or Firm*—Roylance, Abrams, Berdo & Goodman, LLP

(57) ABSTRACT

The present invention relates to a charge system comprising an electric apparatus that comprises a first rechargeable battery and an adapter for supplying power to the first rechargeable battery, and a charger connected to the electric apparatus and used to charge a second rechargeable battery. The charge system employs a first charging part for charging the first rechargeable battery with the power supplied from the adapter, a first interface for forming a power supplying path and connecting to the charger, a power switch for switching the power supplying path between the electric apparatus and the charger via the first interface, and a first controller for controlling the first charging part and the power switch to enable the first rechargeable battery and the second rechargeable battery to be charged in sequence when the adapter is connected to the electric apparatus in the state that the charger is connected to the electric apparatus, and control the power switch to make the first rechargeable battery and the second rechargeable battery be discharged in sequence when the adapter is not connected to the electric apparatus.

11 Claims, 5 Drawing Sheets

CHARGE SYSTEM AND CHARGER FOR AN ELECTRIC APPARATUS AND A CONTROL METHOD THEREOF

CROSS-REFERENCE TO RELATED APPLICATIONS

This application claims the benefit under 35 U.S.C. 119(a) of Korean Patent Application No. 2004-0093687, filed on Nov. 16, 2004, in the Korean Intellectual Property Office, the entire disclosure of which is incorporated herein by reference.

BACKGROUND OF THE INVENTION

1. Field of the Invention

The present invention relates to a charge system and a charger for an electric apparatus, and a control method thereof. More particularly, the present invention relates to a charge system and a charger for an electric apparatus, and a control method thereof, in which a rechargeable battery mounted on the electric apparatus and another rechargeable battery mounted on an external charger are sequentially charged and discharged.

2. Description of the Related Art

Recently, portable electric apparatuses such as notebook computers, cellular phones, a personal digital assistants (PDAs), MP3 players and the like have increased in popularity. Typically, lithium ion batteries, a nickel metal hydride (NiMH) batteries, a nickel cadmium (Ni—Cd) batteries and other various rechargeable batteries are used as a power source for the electric apparatus.

If the rechargeable battery is mounted on a conventional electric apparatus, the electric apparatus is provided with a charging circuit which receives direct current (DC) power converted from alternating current (AC) power through an AC/DC converter (usually referred to as an adapter) charging the rechargeable battery DC power. Moreover, if a separate rechargeable battery is added in order to use the electric apparatus as long as possible, the separate rechargeable battery should be charged through a separate external charger connected to the AC/DC converter. Alternatively, the electric apparatus and the charger can be connected to two separate AC/DC converters, respectively. In this case, the respective rechargeable batteries are charged independently of each other.

Meanwhile, when the rechargeable battery mounted on the electric apparatus is discharged as the electric apparatus is used, and thus its voltage falls below a predetermined level, the mounted rechargeable battery that is completely discharged is usually replaced by the separate rechargeable battery that is charged using the separate charger.

Therefore, a need exists to make the rechargeable battery mounted on the electric apparatus be easily charged, and make the use time of the electric apparatus last as long as possible.

SUMMARY OF THE INVENTION

Accordingly, it is an aspect of the present invention to provide a charge system and a charger for an electric apparatus and a controlling method thereof, in which a rechargeable battery mounted on the electric apparatus and another rechargeable battery mounted on an external charger are charged in sequence through one adapter, and the respective rechargeable batteries completely charged can be discharged in sequence to supply electric power to the electric apparatus.

The foregoing and/or other aspects of the present invention are also achieved by providing a charge system comprising an electric apparatus that comprises a first rechargeable battery and an adapter for supplying power to the first rechargeable battery, and a charger for connecting to the electric apparatus and charging a second rechargeable battery. The charge system comprises a first charging part for charging the first rechargeable battery with the power supplied from the adapter, a first interface for forming a power supplying path and connecting with the charger, a power switch for switching the power supplying path between the electric apparatus and the charger via the first interface, and a first controller for controlling the first charging part and the power switch to enable the first rechargeable battery and the second rechargeable battery to be charged in sequence when the adapter is connected to the electric apparatus in the state that the charger is connected to the electric apparatus, and control the power switch to enable the first rechargeable battery and the second rechargeable battery be discharged in sequence when the adapter is not connected to the electric apparatus.

According to an aspect of the present invention, the first controller controls the first charging part to charge the first rechargeable battery by disabling the power switch when the adapter is connected to the electric apparatus, and controls the power to be supplied from the adapter to the charger via the first interface by enabling the power switch when the first rechargeable battery is completely charged.

According to an aspect of the present invention, the charge system further comprises a first discharging switch interposed between the first rechargeable battery and the power switch to switch driving power supplied from the first rechargeable battery, wherein the first controller enables the first discharging switch and the power switch to allow the first controller to detect the power state of the first rechargeable battery via the first interface when the adapter is not connected to the electric apparatus.

According to an aspect of the present invention, the charger comprises a second discharging switch to switch driving power supplied from the second rechargeable battery, and the charger enables the second discharging switch to supply the driving power from the second rechargeable battery to the electric apparatus via the first interface when the first controller detects that the first rechargeable battery provided in the electric apparatus is at or below a predetermined voltage level, through the first interface.

According to an aspect of the present invention, the first controller disables the first discharging switch and enables the power switch to detect the power state of the second rechargeable battery provided in the charger through the first interface when the adapter is not connected to the electric apparatus.

According to an aspect of the present invention, the first controller enables the first discharging switch and disable the power switch to supply the driving power from the first rechargeable battery to the electric apparatus when the first controller detects that the second rechargeable battery is at or below a predetermined voltage level.

According to an aspect of the present invention, the first controller disables the first discharging switch and enables the power switch to supply the driving power from the second rechargeable battery provided in the charger to the electric apparatus via the first interface when the first controller detects that the second rechargeable battery is at or below a predetermined voltage level.

The foregoing and/or other aspects of the present invention are also achieved by providing a charger connected to an electric apparatus connected with an adapter and charging a second rechargeable battery, the charger comprising a second interface forming a power supplying path and connected to the electric apparatus, a second charging part to charge the second rechargeable battery with power supplied from the adapter via the second interface, a second discharging switch interposed between the second rechargeable battery and the second interface to switch driving power supplied from the second rechargeable battery, and a second controller to control the second charging part to charge the second rechargeable battery with the power supplied from the adapter via the second interface, and control the second discharging switch to supply the driving power from the second rechargeable battery to the electric apparatus via the second interface.

According to an aspect of the present invention, the second controller detects a power state of a first rechargeable battery provided in the electric apparatus via the second interface.

According to an aspect of the present invention, the second controller enables the second discharging switch to supply the driving power from the second rechargeable battery to the electric apparatus via the second interface when the second controller detects that the first rechargeable battery provided in the electric apparatus is at or above a predetermined voltage level, through the second interface.

The foregoing and/or other aspects of the present invention are also achieved by providing a method of controlling a charge system comprising an electric apparatus that comprises a first charging part to charge a first rechargeable battery with power supplied from an adapter, a first interface forming a power supplying path and connected with an external device, and a power switch to switch the power supplying path, and a charger that comprises a second interface connected with the first interface, and a second charging part connected to the electric apparatus via the second interface to charge a second rechargeable battery with the power supplied from the adapter. The method comprises connecting the charger to the electric apparatus via the first and second interfaces, determining whether the adapter is connected to the electric apparatus, and controlling the first and second charging parts to sequentially charge the first and second rechargeable batteries with the power supplied from the adapter in a predetermined order in a charging mode when the adapter is connected to the electric apparatus, and controlling the first and second rechargeable batteries to be sequentially discharged in a predetermined order and supply the driving power to the electric apparatus in a discharging mode when the adapter is not connected to the electric apparatus.

According to an aspect of the present invention, the method further comprises controlling the first charging part to charge the first rechargeable battery by disabling the power switch in the charging mode; and controlling the second charging part of the charger to charge the second rechargeable battery with the power supplied from the adapter via the first and second interfaces by enabling the power switch when the first rechargeable battery is completely charged.

According to an aspect of the present invention, the electric apparatus comprises a first discharging switch interposed between the first rechargeable battery and the power switch to switch driving power supplied from the first rechargeable battery, and the electric apparatus controls the first discharging switch and the power switch to be enabled to make the charger detect a power state of the first rechargeable battery via the second interface in the discharging mode.

According to an aspect of the present invention, the charger comprises a second discharging switch interposed between the second rechargeable battery and the second interface to switch driving power supplied from the second rechargeable battery, and the charger controls the second discharging switch to be enabled to supply the driving power from the second rechargeable battery of the charger to the electric apparatus via the second interface.

According to an aspect of the present invention, the method further comprises controlling the second discharging switch of the charger to be enabled to supply the driving power from the second rechargeable battery to the electric apparatus via the interface when the charger detects that the first rechargeable battery of the electric apparatus is at or below a predetermined voltage level.

According to an aspect of the present invention, the method further comprises allowing the electric apparatus to control the first discharging switch to be disabled and the power switch to be enabled to detect the power state of the second rechargeable battery provided in the charger via the first interface.

According to an aspect of the present invention, the method further comprises allowing the electric apparatus to control the first discharging switch to be enabled and the power switch to be disabled to supply the driving power from the first rechargeable battery to the electric apparatus when it is detected that the second rechargeable battery has a predetermined voltage level or below.

According to an aspect of the present invention, the method further comprises allowing the electric apparatus to control the first discharging switch to be disabled and the power switch to be enabled to supply the driving power from the second rechargeable battery to the electric apparatus via the first and second interfaces.

BRIEF DESCRIPTION OF THE DRAWINGS

The above and/or other aspects and advantages of the present invention will become apparent and more readily appreciated from the following description of the embodiments, taken in conjunction with the accompany drawings of which.

Throughout the drawings, the same element is designated by the same reference numeral or character.

DETAILED DESCRIPTION OF EXEMPLARY EMBODIMENTS

Figure 1:
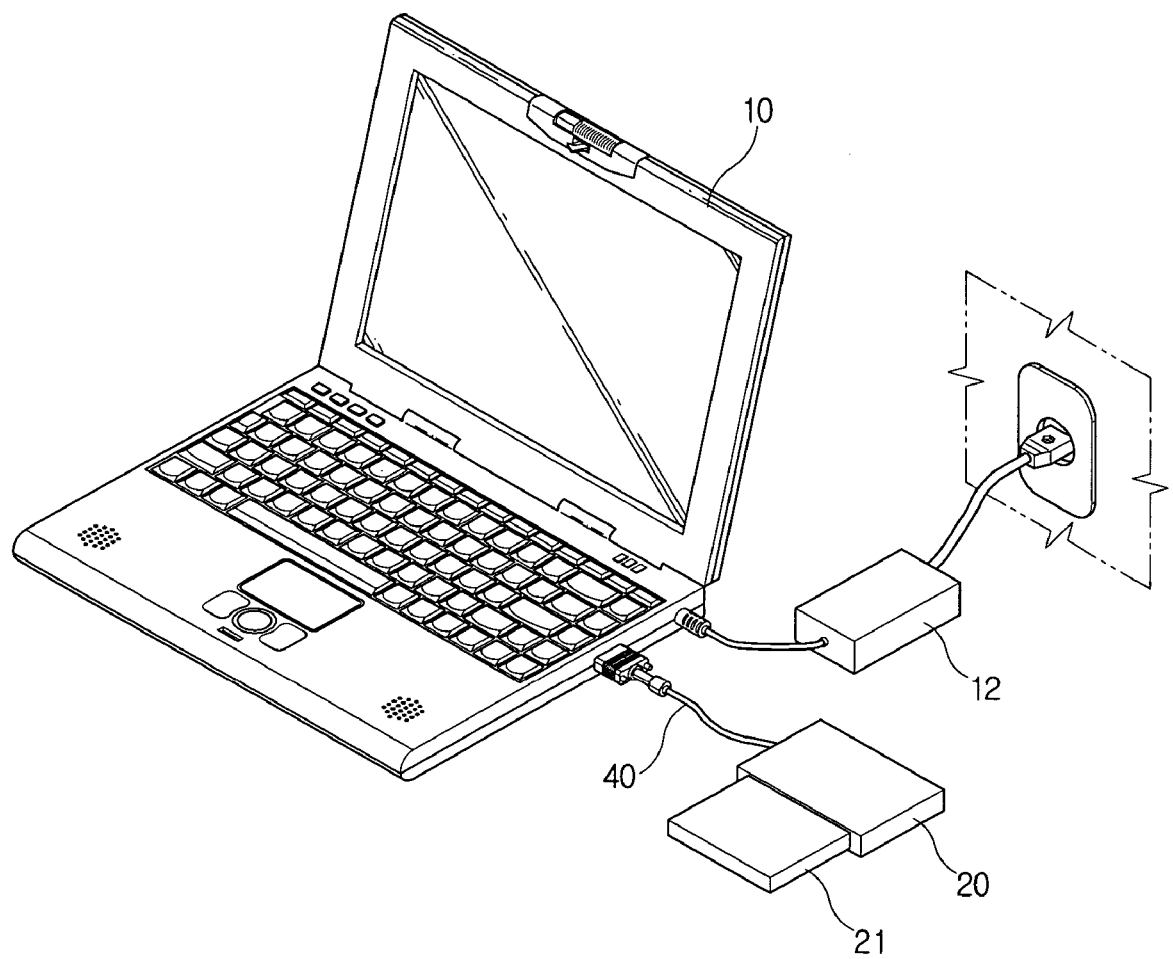
FIG. 1 schematically illustrates a charge system, which comprises an electronic apparatus and a charger, according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
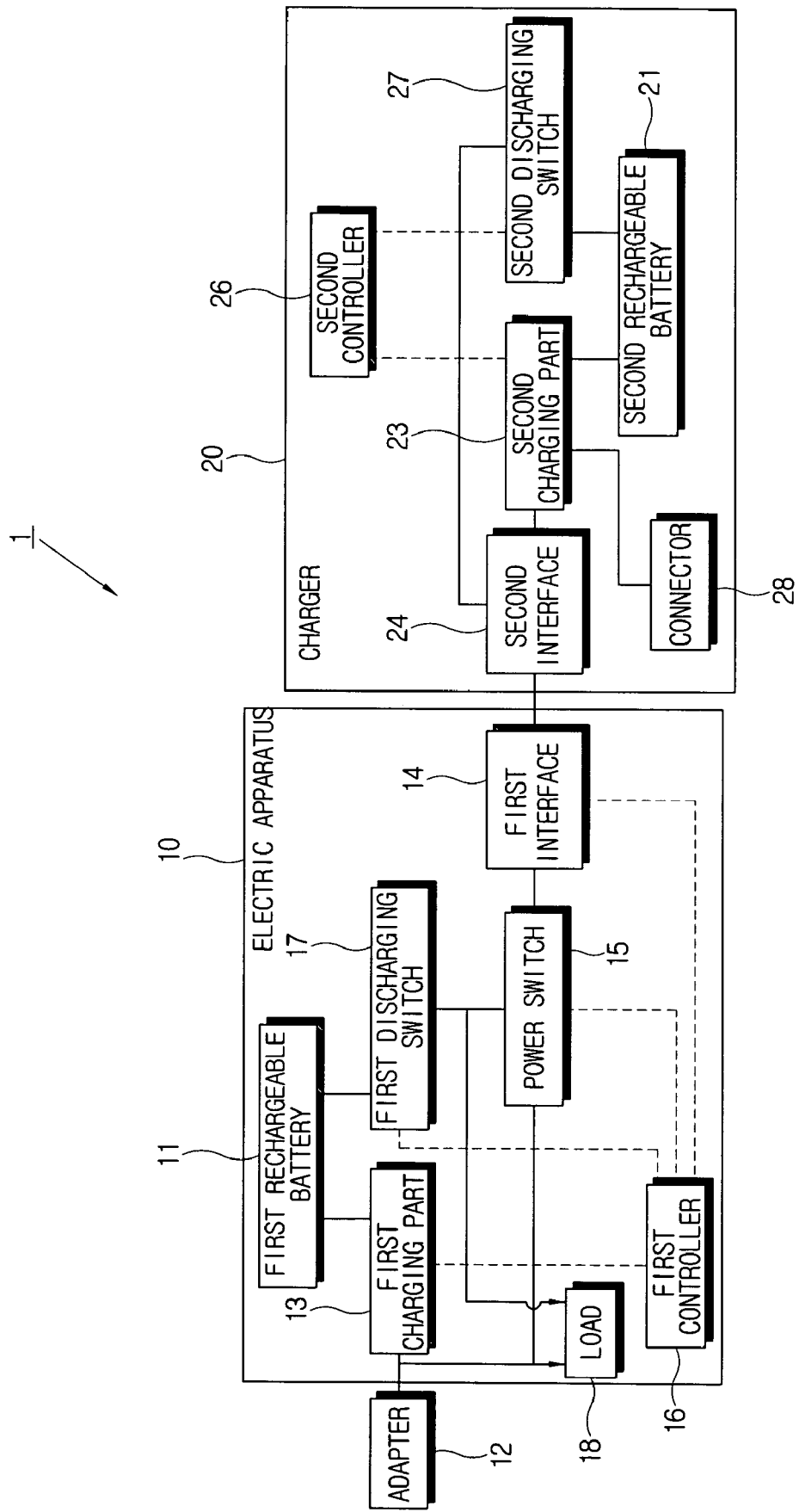
FIG. 2 is a block diagram of the charge system according to an embodiment of the present invention.

FIG. 1 schematically illustrates a charge system, which comprises an electronic apparatus and a charger, according to an embodiment of the present invention, and FIG. 2 is a block diagram of the charge system according to an embodiment of the present invention. As shown therein, a charge system 1 comprises an electric apparatus 10 provided with an internal charging/discharging unit, and a separate charger 20 connected to the electric apparatus 10.

In FIG. 1, a notebook computer is illustrated as the electric apparatus 10, but the electric apparatus 10 is not limited to such a notebook computer and may include any type of electric apparatus as well as portable device such as a Personal Digital Assistant (PDA), an MP3 player, a cellular phone and the like, which can be operated by the rechargeable battery mounted therein.

The electric apparatus 10 receives power through an adapter 12 used as an AC/DC converter to convert AC power into predetermined DC power, so that the rechargeable battery is charged with the DC power supplied from the adapter 12 by a charging circuit provided in the internal charging/discharging unit. Here, the adapter 12 is illustrated as an external device provided separately from the electric apparatus 10, but may be internally provided in the electric apparatus 10.

The charger 20 is connected to the electric apparatus 10 via a predetermined interface, and charges a separate rechargeable battery 21 with power supplied from the adapter 12.

Here, when the adapter 12 is connected to the electric apparatus 10 in a state that the charger 20 is connected to the electric apparatus 10, the electric apparatus 10 enters a charging mode, so that the rechargeable battery internally provided in the electric apparatus 10 and the separate rechargeable battery provided in the charger 20 are charged in a predetermined charging order. At this time, the electric apparatus 10 can be operated by the power supplied from the adapter 12 independently of the charging operation of each rechargeable battery.

On the other hand, when the adapter 12 is not connected to the electric apparatus 10, the electric apparatus 10 enters a discharge mode, so that the rechargeable battery internally provided in the electric apparatus 10 and the separate rechargeable battery provided in the charger 20 are discharged in a predetermined discharging order, thereby supplying the power to the electric apparatus 10.

Here, the electric apparatus 10 and the charger 20 are connected to each other through a predetermined interface such as a universal serial bus (USB) port, an institute of electrical and electronics engineers (IEEE) 1394 port, or the like. In FIG. 1, a reference number 40 indicates an interface cable to connect the electric apparatus 10 with the charger 20.

Hereinafter, the rechargeable battery provided in the electric apparatus 10 will be called a first rechargeable battery 11, and the rechargeable battery provided in the charger 20 will be called a second rechargeable battery 21.

As shown in FIG. 2, the electric apparatus 10 comprises a first charging part 13 to charge the first rechargeable battery 11 with the power supplied from the adapter 12; a first interface 14 to which the charger 20 is connected; a power switch 15 to switch a power supplying path formed between the electric apparatus 10 and the charger 20 via the first interface 14; a first discharging switch 17 interposed between the first rechargeable battery 11 and the power switch 15 and switching driving power supplied from the first rechargeable battery 11; and a first controller 16 to control the first charging part 13, the first interface 14, the power switch 15 and the first discharging switch 17. Here, the adapter 12 can be connected to the electric apparatus 10 through a connector (not shown), and a sensor (not shown) may be additionally provided to detect whether the adapter 12 is connected to the electric apparatus 10. Further, when the adapter 12 is connected to the electronic apparatus 10, the charging mode is implemented while the power needed for driving a load 18 is supplied to the load 18 via a predetermined power supplying path extending from the adapter 12.

Further, the charger 20 comprises a second interface 24 connected to the first interface 14 of the electric apparatus 10; a second charging part 23 to charge the second rechargeable battery 21 with the power received from the adapter 12 through the second interface 24; a second discharging switch 27 interposed between the second rechargeable battery 21 and the second interface 24 and switching driving power supplied from the second rechargeable battery 21; and a second controller 26 to control the second interface 24, the second charging part 23, and the second discharging switch 27. Further, the charger 20 comprises a connector 28 to which a separate adaptor is connected, so that the second rechargeable battery 21 may be charged with power supplied from the separate adapter even though the charger 20 is not connected to the electric apparatus 10.

Here, the first interface 14 and the second interface 24, which are connected by the interface cable 40, may have a data transfer line in addition to a power transfer line, thereby enabling data communication therebetween. Each transfer line is designed to meet predetermined interface standards such as USB or IEEE1394. Thus, the power needed for the charging operation and the driving power are supplied between the electric apparatus 10 and the charger 20 through each power transfer line of the first and second interfaces 14 and 24. Further, the electric apparatus 10 and the charger 20 are configured to detect a power state of their opponent rechargeable batteries.

Each switch 15, 17, 27 may be realized by a semiconductor switching device such as a field effect transistor (FET) or the like. Hereinafter, the first discharging switch 17, the power switch 15 and the second discharging switch 27 will be described in parallel with an FET1, an FET2, and an FET3, respectively.

Figure 4:
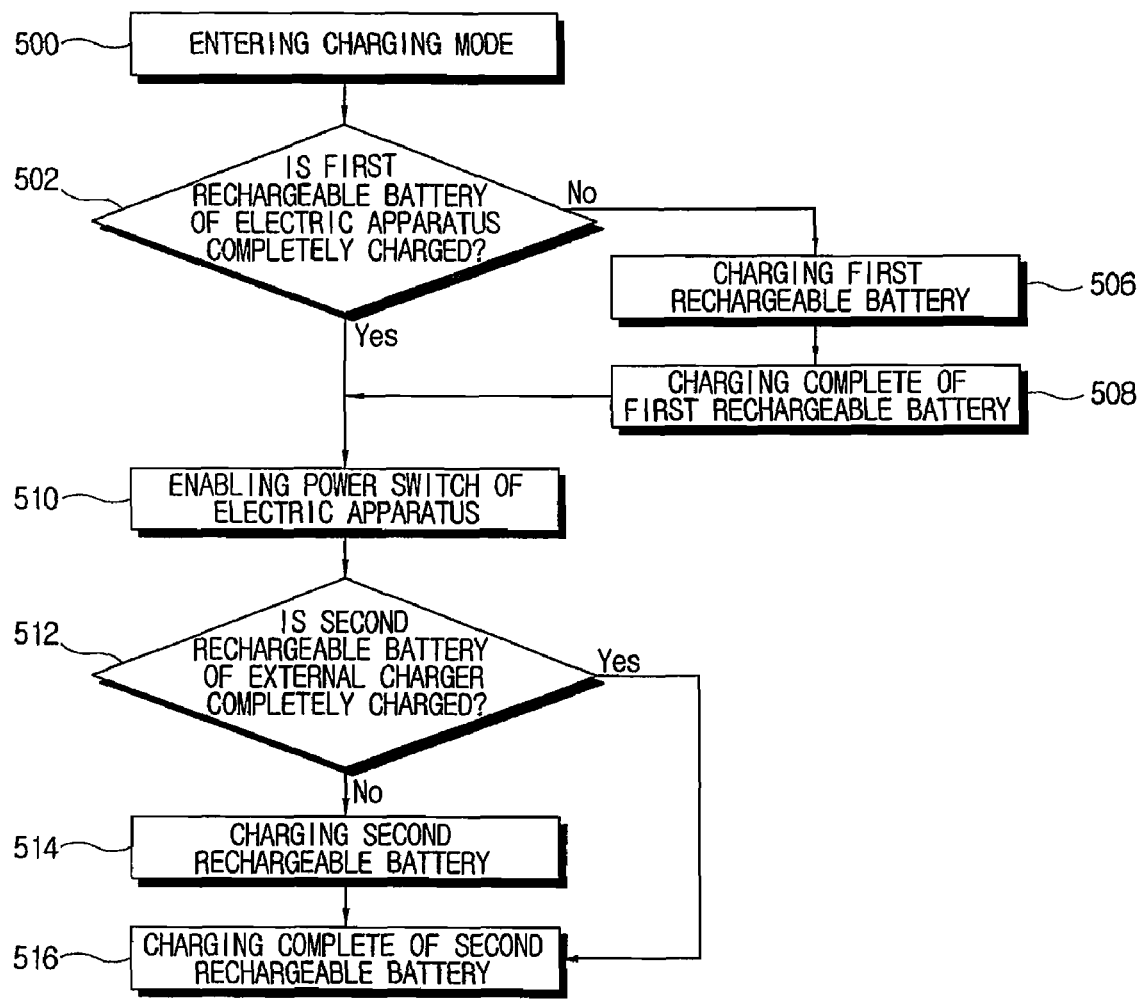
FIG. 4 is a control flowchart of the charge system in a charging mode according to an embodiment of the present invention.
Figure 5:
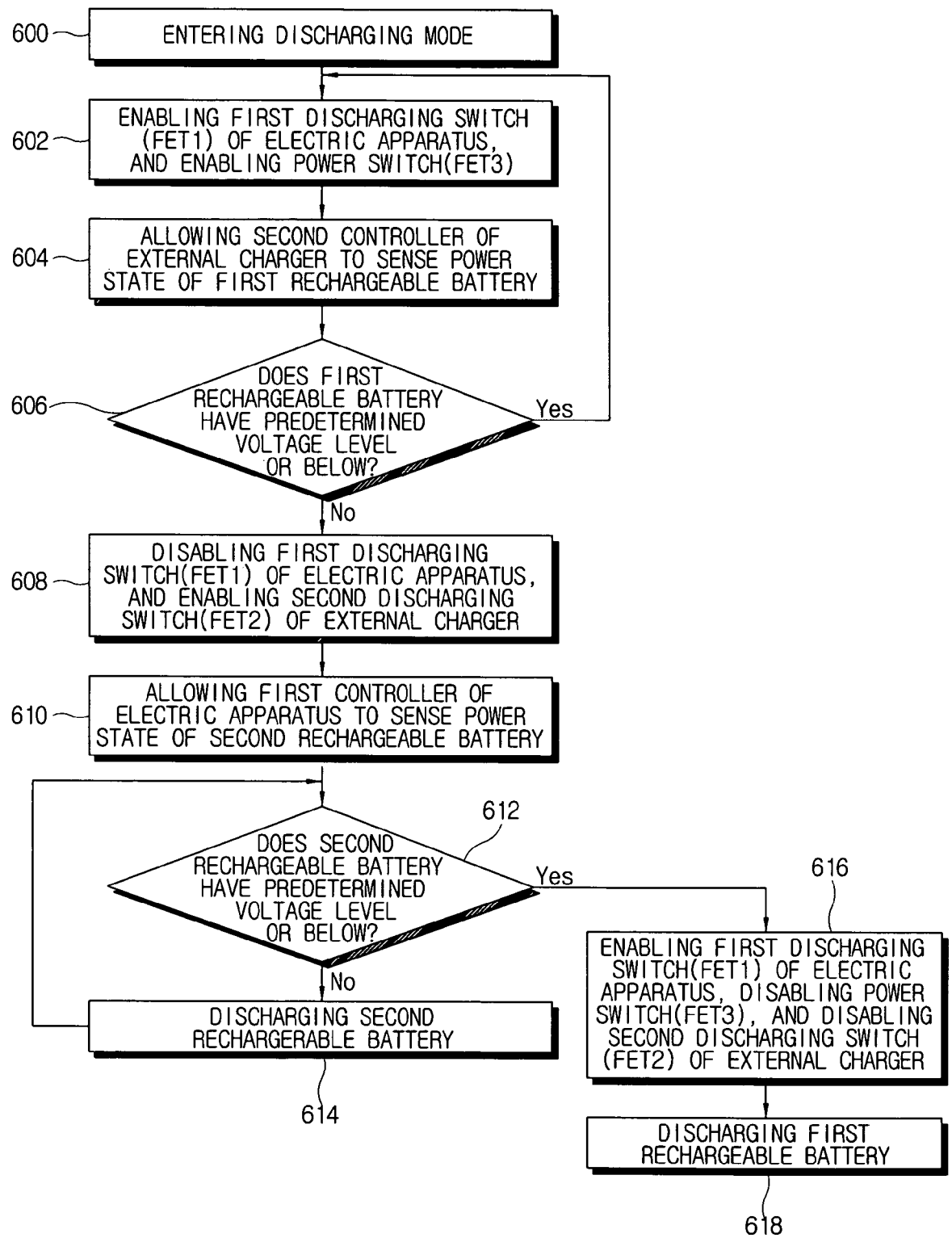
FIG. 5 is a control flowchart of the charge system in a discharging mode according to an embodiment of the present invention.

With this configuration, the charging mode and the discharging mode of the charge system according to an embodiment of the present invention will be described with reference to FIGS. 3 through 5.

At operation 100, the electric apparatus 10 is powered on. At operation 200, the first controller 16 determines whether the separate charger 20 is connected to the first interface 14. Here, the first controller 16 controls the operation mode of the electric apparatus 10 differently according to whether the electric apparatus 10 is connected to the charger 20. Therefore, when the electric apparatus 10 is connected with the charger 20, at operation 300, the first controller 16 controls the electric apparatus 10 to enter an external charger mode. On the other hand, when the electric apparatus 10 is connected with not the charger 20 but another peripheral unit, at operation 210, the first controller 16 controls the electric apparatus 10 to enter a peripheral unit mode, thereby enabling the power switch 15 and thus making a data transfer between the peripheral unit and the electric apparatus 10 possible at operation 220.

When the electric apparatus 10 enters the external charger mode, at operation 400, the first controller 16 determines whether the adapter 12 is connected to the electric apparatus 10. As a result of the determination, when the adapter 12 is connected to the electric apparatus 10, at operation 500, the charging mode is implemented. On the other hand, when the adapter 12 is not connected to the electric apparatus 10, at operation 600, the discharging mode is implemented. Here, when the adapter 12 is connected to the electric apparatus 10, the first controller 16 controls the power switch 15 to be selectively turned on/off, thereby sequentially charging the first rechargeable battery 11 and the second rechargeable battery 21 in a predetermined order. On the other hand, when the adapter 12 is not connected to the electric apparatus 10, the first controller 16 controls the power switch 15 to be selectively turned on/off, thereby sequentially discharging the first rechargeable battery 11 and the second rechargeable battery 21 in a predetermined order. In the discharging mode, the power needed for driving the load 18 of the electric apparatus 10 is supplied through a predetermined power supplying path extending from each rechargeable battery.

Figure 3:
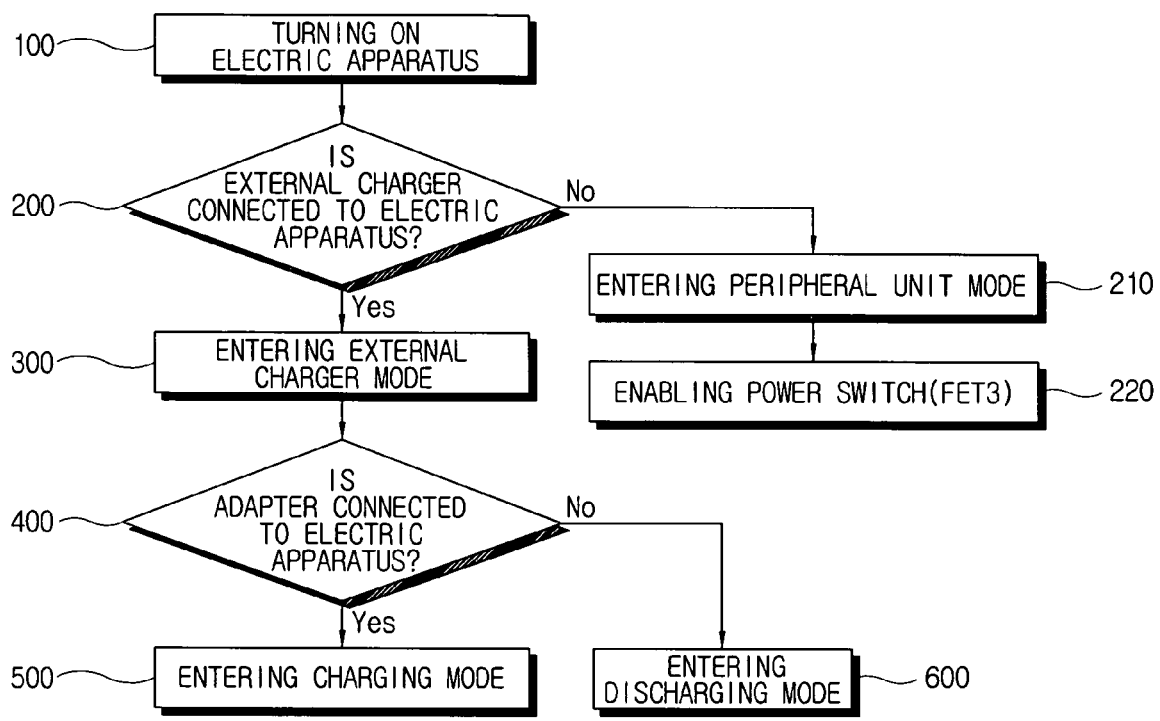
FIG. 3 is a control flowchart of the charge system according to an embodiment of the present invention.

According to an embodiment shown in FIG. 3, it is determined whether the adapter 12 is connected to the electric apparatus 10, after determining the separate charger 20 is connected to the electric apparatus 10. Alternatively, it may be determined whether the separate charger 20 is connected to the electric apparatus 10, after determining the separate charger 20 is connected to the electric apparatus 10.

Thus, the electric apparatus 10 enters the charging mode after the adapter 12 is connected to the electric apparatus 10, so that the second rechargeable battery 21 provided in the separate charger 20 can be sequentially charged even though the charger 20 is connected to the electric apparatus 10 while the first rechargeable battery 11 is being charged.

Further, in a case that the charger 20 is connected to the electric apparatus 10 while the electric apparatus 10 is in the discharging mode and receives the driving power from the first rechargeable battery 11 in the state that the adapter 12 is not connected to the electric apparatus 10, the second rechargeable battery 21 provided in the charger 20 is sequentially discharged to supply the driving power to the electric apparatus 10.

As described above, the charging mode implemented in the state that the charger 20 and the adapter 12 are connected to the electric apparatus 10 will be described in more detail with reference to FIG. 4.

As the charging mode is implemented in the operation 500, at operation 502, the first controller 16 determines whether the first rechargeable battery 11 is completely charged to a predetermined voltage level. When the first rechargeable battery 11 is not completely charged, at operation 506, the first controller 16 controls the first charging part 13 to supply the power from the adapter 12 to the first rechargeable battery 11. At the same time, the first controller 16 disables the power switch 15, thereby cutting off the power supplied from the adapter 12 to the charger 20.

Then, at operation 508, when the first rechargeable battery 11 is completely charged with a predetermined voltage level, the first controller 16 controls the first charging part 13 to end the charging operation of the first rechargeable battery 11. Thus, according to an embodiment of the present invention, the first rechargeable battery 11 is first completely charged to a predetermined voltage level, and then the second rechargeable battery 21 is continuously charged.

That is, when the first rechargeable battery 11 is completely charged, at operation 510, the first controller 16 enables the power switch 15 to switch the power supplying path between the electric apparatus 10 and the charger 20, thereby supplying the power from the adapter 12 to the charger 20 via the first and second interfaces 14 and 24. Then, the second controller 26 of the charger 20 controls the second charging part 23 to supply the power from the adapter 12 to the second rechargeable battery 21 via the second interface 24.

At operation 512, the second controller 26 determines whether the second rechargeable battery 21 is completely charged. When the second rechargeable battery 21 is completely charged to a predetermined voltage level, at operation 514, the second controller 26 ends the charging operation. On the other hand, when the second rechargeable battery 21 is not completely charged, the second controller 26 controls the second charging part 23 to supply the power from the adapter 12 to the second rechargeable battery 21, thereby completely charging the second rechargeable battery 21 and ending the charging operation at operations 514 and 516.

The discharging mode implemented without the adapter 12 in the state that the charger 20 and the adapter 12 are connected to the electric apparatus 10 will be described in more detail with reference to FIG. 5.

According to an embodiment of the present invention, the discharging mode can be implemented when the separate charger 20 is connected to the electric apparatus 10 while the electric apparatus 10 is operated while receiving power from the first rechargeable battery 11 without the adapter 12. Alternatively, the discharging mode can be implemented when the electric apparatus 10 is powered on without the adapter 12 while the separate charger 20 is connected to the electric apparatus 10.

As the discharging mode is implemented in operation 600, the second rechargeable battery 21 of the separate charger 20 connected to the electric apparatus 10 is completely discharged, and then sequentially the first rechargeable battery 11 provided in the electric apparatus 10 is completely discharged, thereby providing a convenience to the user in that the user has a back up power supply after the discharge of the second rechargeable battery 21.

When the discharging mode is implemented, at operation 602, the first controller 16 enables both the FET1 of the first discharging switch 17 and the power switch 15. Thus, at operation 604, the second controller 26 provided in the charger 20 determines the power state of the first rechargeable battery 11 through the second interface 24. Before discharging the second rechargeable battery 21, at operation 606, the charger 20 determines whether the first rechargeable battery 11 has a voltage level sufficient to drive the electric apparatus 10.

As a result of the determination, in a case that the first rechargeable battery 11 does not reach a predetermined voltage level or below, the operations 602 and 604 are repeated until the first rechargeable battery 11 reaches the predetermined voltage level or below.

When the first rechargeable battery 11 reaches the predetermined voltage level or below, the first controller 16 of the electric apparatus 10 disables the FET1 of the first discharging switch 17, and the second controller 26 of the separate charger 20 enables the second discharging switch 27, thereby preparing the second rechargeable battery 21 for discharging at operation 608.

Thus, at operation 610, the second rechargeable battery 21 supplies the power via the power supplying path of the first interface 14 connected with the second interface 24, and the first controller 16 can determine the power state of the second rechargeable battery 21. At operation 612, the first controller 16 determines whether the second rechargeable battery 21 has a predetermined voltage level. When it is determined that the second rechargeable battery 21 has a voltage level sufficient to drive the electric apparatus 10, the power switch 15 is maintained in the enable state, thereby supplying the power from the second rechargeable battery 21 to the electric apparatus 10 at operation 610. At this time, the second controller 26 enables the FET3 of the second discharging switch 27, thereby allowing the second charger 21 to supply the power via the second interface 24. In this case, the first controller 16 controls the electric apparatus 10 to not enter the charging mode, so that the power of the second rechargeable battery 21 is prevented from being supplied as the power for charging the first rechargeable battery 11.

On the other hand, in a case that the second rechargeable battery 21 is completely discharged or the second rechargeable battery 21 of the charger 20 has a low voltage level, the first controller 16 determines that the second rechargeable battery 21 does not have a voltage level enough to drive the electric apparatus 10. In this case, at operation 616, the first controller 16 disables the FET2 of the power switch 15, and thus cuts off the power supplying path from the second rechargeable battery 21 of the charger 20. Further, at operation 616, the first controller 16 enables the FET1 of the first discharging switch 17 to supply the driving power from the first rechargeable battery 11 to the electric apparatus 10. Thus, at operation 618, the first rechargeable battery 11 is discharged. At this time, the second controller 27 disables the FET3 of the second discharging switch 27 to prevent the second rechargeable battery 21 of the charger 20 from discharging.

In the foregoing embodiment, in the charging mode, the second rechargeable battery 21 is charged after the first rechargeable battery 11 is completely charged. Alternatively, in the charging mode, the first rechargeable battery 11 may be charged after the second rechargeable battery 21 is completely charged.

In the foregoing embodiment, in the discharging mode, the first rechargeable battery 11 is sequentially discharged after the second rechargeable battery 21 is completely discharged. Alternatively, in the discharging mode, the second rechargeable battery 21 may be sequentially discharged after the first rechargeable battery 11 is completely discharged.

As described above, the present invention provides a charge system and a charger for electric apparatus and a controlling method thereof, in which a rechargeable battery mounted on the electric apparatus and another rechargeable battery mounted on an external charger are charged in sequence through one adapter, and the respective rechargeable batteries completely charged can be discharged in sequence to supply electric power to the electric apparatus.

Although certain embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A charge system comprising:
   an electric apparatus that comprises a first rechargeable battery and an adapter for supplying power to the first rechargeable battery, and a charger for connecting to the electric apparatus and charging a second rechargeable battery, the charge system comprising:
   a first charging part for charging the first rechargeable battery with the power supplied from the adapter;
   a first interface for providing a power supplying path and connecting with the charger;
   a power switch for switching the power supplying path between the electric apparatus and the charger via the first interface;
   a first controller for controlling the first charging part and the power switch to enable the first rechargeable battery and the second rechargeable battery to be charged in sequence when the adapter is connected to the electric apparatus in the state that the charger is connected to the electric apparatus, and control the power switch to enable the first rechargeable battery and the second rechargeable battery be discharged in sequence when the adapter is not connected to the electric apparatus; and
   a first discharging switch interposed between the first rechargeable battery and the power switch to switch driving power supplied from the first rechargeable battery, wherein the first controller enables the first discharging switch and the power switch to allow the charger to detect the power state of the first rechargeable battery via the first interface when the adapter is not connected to the electric apparatus.

2. The charge system according to claim 1, wherein the charger comprises a second discharging switch to switch driving power supplied from the second rechargeable battery, and the charger enables the second discharging switch to supply the driving power from the second rechargeable battery to the electric apparatus via the first interface when the charger detects that the first rechargeable battery provided in the electric apparatus has a voltage below a predetermined voltage level, through the first interface.

3. The charge system according to claim 1, wherein the first controller disables the first discharging switch and enables the power switch to detect the power state of the second rechargeable battery provided in the charger through the first interface when the adapter is not connected to the electric apparatus.

4. The charge system according to claim 3, wherein the first controller enables the first discharging switch and disables the power switch to supply the driving power from the first rechargeable battery to the electric apparatus when the first controller detects that the second rechargeable battery is at or below a predetermined voltage level.

5. The charge system according to claim 4, wherein the first controller disables the first discharging switch and enables the power switch to supply the driving power from the second rechargeable battery provided in the charger to the electric apparatus via the first interface when the first controller detects that the second rechargeable battery has a predetermined voltage level or more.

6. A method of controlling a charge system comprising an electric apparatus that comprises a first charging part for charging a first rechargeable battery with power supplied from an adapter, a first interface for forming a power supplying path and connecting to an external device, and a power switch for switching the power supplying path, and a charger that comprises a second interface connected with the first interface, and a second charging part connected to the electric apparatus via the second interface to charge a second rechargeable battery with the power supplied from the adapter, the method comprising:
   connecting the charger to the electric apparatus via the first and second interfaces;
   determining whether the adapter is connected to the electric apparatus; and
   controlling the first and second charging parts to sequentially charge the first and second rechargeable batteries with the power supplied from the adapter in a predetermined order in a charging mode of when the adapter is connected to the electric apparatus, and controlling the first and second rechargeable batteries to be sequentially discharged in a predetermined order and supply the driving power to the electric apparatus in a discharging mode when the adapter is not connected to the electric apparatus;
   wherein the electric apparatus comprises a first discharging switch interposed between the first rechargeable battery and the power switch to switch driving power supplied from the first rechargeable battery, and the electric apparatus controls the first discharging switch and the power switch to be enabled to enable the charger to detect a power state of the first rechargeable battery via the second interface in the discharging mode.

7. The method according to claim 6, wherein the charger comprises a second discharging switch interposed between the second rechargeable battery and the second interface to switch driving power supplied from the second rechargeable battery, and the charger controls the second discharging switch to be enabled to supply the driving power from the second rechargeable battery of the charger to the electric apparatus via the second interface in the discharging mode.

8. The method according to claim 6, further comprising controlling the second discharging switch of the charger to be enabled to supply the driving power from the second rechargeable battery to the electric apparatus via the interface when the charger detects that the first rechargeable battery of the electric apparatus is at or below a predetermined voltage level.

9. The method according to claim 6, further comprising allowing the electric apparatus to control the first discharging switch to be disabled and the power switch to be enabled to detect the power state of the second rechargeable battery provided in the charger via the second interface in the discharging mode.

10. The method according to claim 9, further comprising allowing the electric apparatus to control the first discharging switch to be enabled and the power switch to be disabled to supply the driving power from the first rechargeable battery to the electric apparatus when it is detected that the second rechargeable battery is at or below a predetermined voltage level.

11. The method according to claim 9, further comprising allowing the electric apparatus to control the first discharging switch to be disabled and the power switch to be enabled to supply the driving power from the second rechargeable battery to the electric apparatus via the first and second interfaces when it is detected that the second rechargeable battery has a predetermined voltage level or greater.

* * * * *